US008654673B2

(12) United States Patent
Dalvi et al.

(10) Patent No.: US 8,654,673 B2
(45) Date of Patent: Feb. 18, 2014

(54) CONFIGURING NETWORKS INCLUDING SPANNING TREES

(75) Inventors: Gaurish R Dalvi, Campbell, CA (US); Choon Lee, Palo Alto, CA (US); Ashish Ranjan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 417 days.

(21) Appl. No.: 13/025,545

(22) Filed: Feb. 11, 2011

(65) Prior Publication Data

US 2011/0134803 A1      Jun. 9, 2011

Related U.S. Application Data

(63) Continuation of application No. 12/113,523, filed on May 1, 2008, now Pat. No. 7,911,982.

(51) Int. Cl.
*H04L 12/56*   (2011.01)

(52) U.S. Cl.
USPC ........................... 370/254; 370/401; 709/220

(58) Field of Classification Search
None
See application file for complete search history.

(56) References Cited

U.S. PATENT DOCUMENTS

| | | | |
|---|---|---|---|
| 6,937,576 B1 | 8/2005 | Di Benedetto et al. | |
| 6,985,449 B2 | 1/2006 | Higashiyama | |
| 7,627,654 B2 | 12/2009 | Ramanathan et al. | |
| 7,760,668 B1 | 7/2010 | Zinjuvadia | |
| 7,911,982 B1 | 3/2011 | Dalvi et al. | |
| 2006/0007939 A1* | 1/2006 | Elangovan | 370/395.53 |
| 2006/0182133 A1 | 8/2006 | Choumaru et al. | |
| 2007/0127464 A1* | 6/2007 | Jain et al. | 370/389 |
| 2007/0258390 A1* | 11/2007 | Khan et al. | 370/256 |
| 2007/0263554 A1* | 11/2007 | Finn | 370/256 |
| 2008/0134327 A1* | 6/2008 | Bharrat et al. | 726/22 |
| 2008/0134328 A1* | 6/2008 | Yang et al. | 726/22 |
| 2008/0134329 A1* | 6/2008 | Perreault et al. | 726/22 |
| 2008/0144533 A1 | 6/2008 | Bulusu et al. | |
| 2009/0185571 A1* | 7/2009 | Tallet | 370/401 |

OTHER PUBLICATIONS

Co-pending U.S. Appl. No. 12/113,523, filed May 1, 2008 entitled "Configuring Networks Including Spanning Trees" by Dalvi et al., 50 pages.
Catalyst 2950 Desktop Switch Software Configuration Guide, "Configuring RSTP and MSTP," pp. 11-1 through 11-24, Apr. 2002.
Cisco Systems, Inc., "Cisco-Understanding Multiple Spanning Tree Protocol (802.1s)", Document ID: 24248, Jun. 1, 2005, 14 total pages.

* cited by examiner

*Primary Examiner* — Hassan Phillips
*Assistant Examiner* — Duc Duong
(74) *Attorney, Agent, or Firm* — Harrity & Harrity, LLP

(57) ABSTRACT

A method may include receiving a reconfiguration to a first Virtual Local Area Network (VLAN)/spanning tree table, where the first VLAN/spanning tree table has a first identifier and is associated with a region of a network; updating the first VLAN/spanning tree table to generate a second VLAN/spanning tree table based on the reconfiguration; determining a second identifier of the second VLAN/spanning tree table; and generating a list of identifiers associated with the region of the network, the list including the first identifier and the second identifier.

20 Claims, 13 Drawing Sheets

100

100

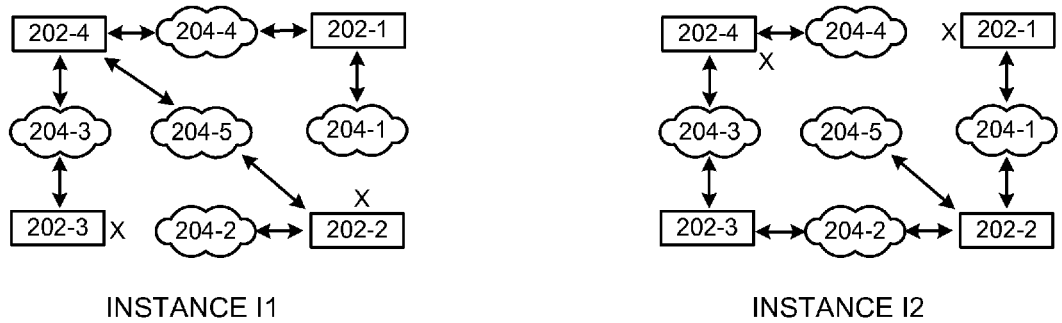
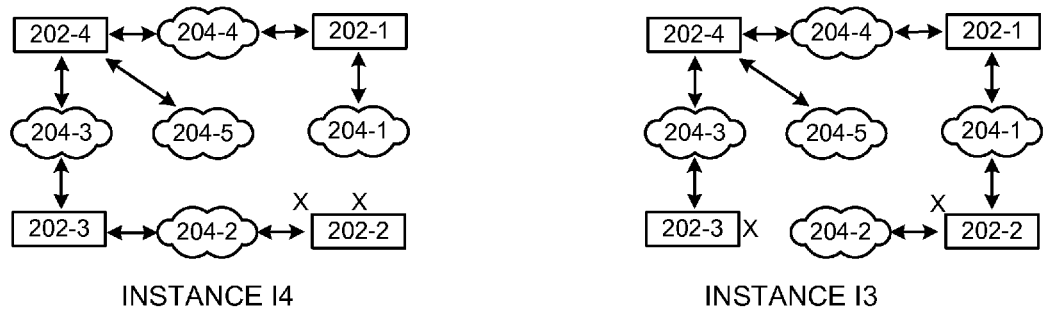
FIG. 3

VLAN/INSTANCE TABLE 664-1

| VLAN 702 | INSTANCE 704 |
|---|---|
| A | I1 |
| B | I2 |
| C | I1 |
| D | I2 |

DIGEST = IAX5

VLAN/INSTANCE TABLE 664-2

| VLAN 702 | INSTANCE 704 |
|---|---|
| A | I1 |
| B | I2 |
| C | I1 |
| D | I2 |
| E | I3 |

DIGEST = 52BY

VLAN/INSTANCE TABLE 664-3

| VLAN 702 | INSTANCE 704 |
|---|---|
| A | I1 |
| B | I2 |
| C | I1 |
| D | I2 |
| E | I3 |
| F | I4 |

720, 722, 724, 726, 728, 730

DIGEST = 62DX

FIG. 7C

FIG. 8A  CONFIGURATION TABLE 666-1

| REGION NAME 802 | REVISION 804 | PRIMARY DIGEST 806 | ALTERNATE DIGEST 808 | FREEZE FLAG 810 |
|---|---|---|---|---|
| REGION 102 | CD | IAX5 |  | NO |

820

FIG. 8B  CONFIGURATION TABLE 666-2

| REGION NAME 802 | REVISION 804 | PRIMARY DIGEST 806 | ALTERNATE DIGEST 808 | FREEZE FLAG 810 |
|---|---|---|---|---|
| REGION 102 | CD | IAX5 | 52BY | YES |

820'

FIG. 8C  CONFIGURATION TABLE 666-3

| REGION NAME 802 | REVISION 804 | PRIMARY DIGEST 806 | ALTERNATE DIGEST 808 | FREEZE FLAG 810 |
|---|---|---|---|---|
| REGION 102 | CD | IAX5 | 62DX | YES |

820"

900

1000

1200

1300

CONFIGURING NETWORKS INCLUDING SPANNING TREES

RELATED APPLICATION

This application is a continuation of U.S. patent application Ser. No. 12/113,523 filed on May 1, 2008, the disclosure of which is incorporated herein by reference.

BACKGROUND

In an increasingly networked world, more and more traffic, such as data, voice, and video, is transmitted over public and proprietary networks. Some network topologies may introduce situations, such as endless communication loops and broadcast floods, which may be undesirable. To help avoid these and other situations, some networks may employ spanning trees. Some spanning tree protocols include the IEEE Standards 802.1D, 802.1W (Rapid Spanning Tree Protocol (RSTP)), or 802.1 Q (Multiple Instances Spanning Tree Protocol (MISTP)). When routing traffic through the network, it may be desirable for a network administrator to change, reconfigure, or test network configurations, including configurations related to spanning trees.

SUMMARY

A method may include receiving a reconfiguration to a first Virtual Local Area Network (VLAN)/spanning tree table, where the first VLAN/spanning tree table includes a first identifier and is associated with a region of a network; updating the first VLAN/spanning tree table to generate a second VLAN/spanning tree table based on the reconfiguration; determining a second identifier of the second VLAN/spanning tree table; and generating a list of identifiers associated with the region of the network, the list including the first identifier and the second identifier.

A method may include receiving a reconfiguration of a first Virtual Local Area Network (VLAN)/spanning tree table, where the first VLAN/spanning tree table is associated with a first identifier and a region of a network; updating the first VLAN/spanning tree table to generate a second VLAN/spanning tree table based on the reconfiguration; and sending, over the network, a data unit including an indication for network devices in the region to determine the region based on information other than the first identifier.

A network device may include a receiver to receive a data unit from a network, the data unit including a digest of a Virtual Local Area Network (VLAN)/spanning tree table associated with a first region of the network; a memory to store a list of digests associated with a second region of the network; and processing logic to: extract, from the data unit, the digest of the VLAN/spanning tree table associated with the first region; and compare the extracted digest to the list of digests associated with the second region.

A network device may include a memory to store a list of digests, where each digest is associated with a different Virtual Local Area Network (VLAN)/spanning tree table, where each VLAN/spanning tree table is associated with a same region of a network, and where the list of digests includes a first digest of a first VLAN/spanning tree table; a receiver to receive a reconfiguration to the first VLAN/spanning tree table; and processing logic. The processing logic may generate a second VLAN/spanning tree table based on the received reconfiguration and the first VLAN/spanning tree table; determine a second digest of the second VLAN/spanning tree table; and add the second digest to form the list of digests associated with the region of the network.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 3 is a block diagram of exemplary spanning tree instances for a network topology, such as the network topologies shown in FIG. 2;

FIGS. 7A, 7B, and 7C are block diagrams of exemplary VLAN/instance table at, for example, different time periods;

FIGS. 8A, 8B, and 8C are block diagrams of an exemplary configuration table at, for example, different time periods;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Embodiments disclosed herein may permit a network device to be reconfigured in a region of a network that employs spanning trees. In one or more embodiments, the network device may be reconfigured without forming a new region in the network.

Exemplary Environment

Figure 1:
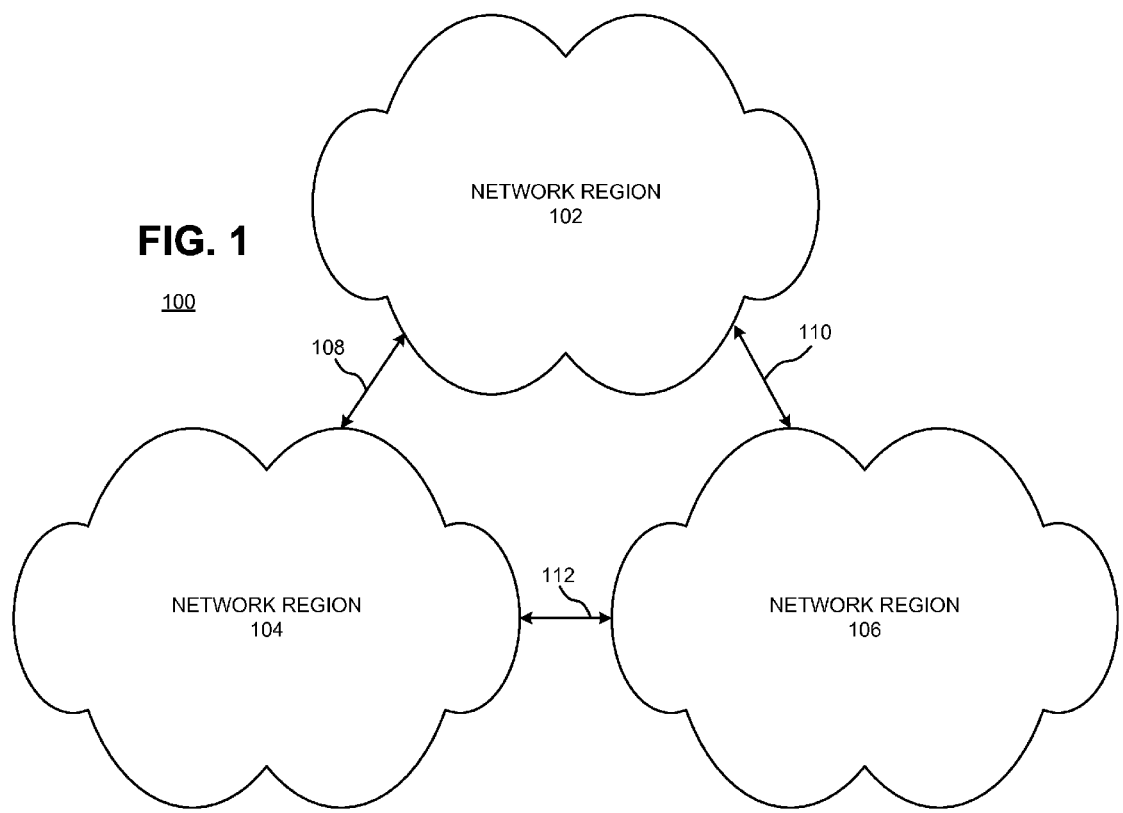
FIG. 1 is a diagram of an exemplary network in which systems and methods described herein may be implemented.

FIG. 1 is a diagram of an exemplary network 100 in which systems and methods described herein may be implemented. As illustrates, network 100 may include three network regions: network region 102, network region 104, and network region 106 ("regions 102, 104, and 106"). Network 100 may be divided into a number of regions, such as regions 102, 104, and 106, for any number of reasons. For example, in one embodiment, network 100 may be divided into regions 102, 104, and 106 because these regions may be geographically separate. Thus, region 102 may be geographically separate from regions 104 and 106; region 104 may be geographically separate from regions 102 and 106; and region 106 may be geographically separate from regions 102 and 104. In other embodiments, regions 102, 104, and 106 may not geographically separate, but may be logically separate. Region 102 may be coupled to region 104 by a communication link 108; region 102 may be coupled to region 106 via a communication link 110; and region 106 may be coupled to region 104 via a communication link 112. The topology of network 100 (e.g., of regions 102, 104, and 106) is exemplary. Further, more, fewer, or different configurations of network regions in network 100 may be possible.

Network 100 and/or regions 102, 104, and 106 may include the Internet, an ad hoc network, a local area network (LAN), a wide area network (WAN), a metropolitan area network (MAN), a cellular network, a public switched telephone network (PSTN), or any other network or combination of networks. Communication among network regions 102, 104, and/or 106 may be accomplished via wired and/or wireless communication connections.

Figure 2:
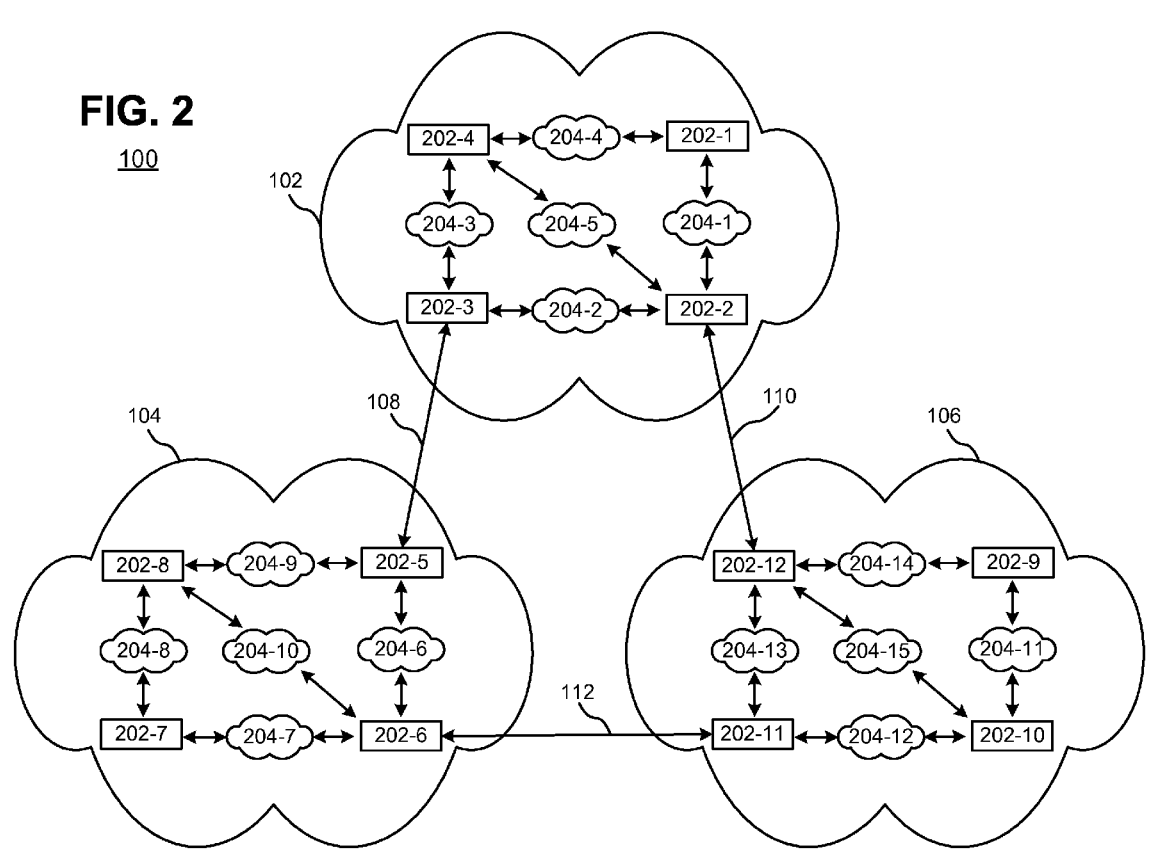
FIG. 2 is a block diagram of the exemplary network of FIG. 1 in more detail.

FIG. 2 is a block diagram of exemplary network 100 in more detail. As shown in FIG. 2, network regions 102, 104, and 106 may include network devices 202-1 through 202-12 (individually "network device 202-x," collectively "network devices 202") and network segments 204-1 through 204-15 (individually "network segment 204-x," collectively "network segments 204"). One or more of network devices 202 may include a switch, a router, a bridge, a server, and/or another type of device. While network devices 202 may be implemented as different types of devices (e.g., gateways, routers, switches, firewalls, network interface cards (NICs), hubs, bridges, etc.), in the following paragraphs network devices 202 may be described in terms of routers.

Network segments 204 may connect one or more network devices 202. One or more of network segments 204 may include a LAN, a WAN, a MAN, an Internet, a cellular network, a PSTN, or any other network or combination of networks. In another embodiment, one or more of network segments 204 may include a physical medium, such as a cable, connecting two network devices 202. In other words, network segment 204-x may provide a communication link between one or more ports of one network device 202-x and one or more ports of another network device 202-x. Communication among network segments 204 and network devices 202 may be accomplished via wired and/or wireless communication connections.

The topology of network devices 202 and network segments 204 in network regions 102, 104, and 106 is exemplary. Further, more, fewer, or different configurations of network devices 202 and network segments 204 may be possible. While regions 102, 104, and 106 have the same topology in FIG. 2, in other embodiments regions 102, 104, and 106 may have different topologies.

As further shown in FIG. 2, network region 102 may include network devices 202-1 through 202-4 and network segments 204-1 through 204-5. Network segment 204-1 may connect network device 202-1 and network device 202-2; network segment 204-2 may connect network device 202-2 and network device 202-3; network segment 204-3 may connect network device 202-3 and network device 202-4; network segment 204-4 may connect network device 202-4 and network device 202-1; and network segment 204-5 may connect network device 202-4 and network device 202-2.

Further, network region 104 may include network devices 202-5 through 202-8 and network segments 204-6 through 204-10. Network segment 204-6 may connect network device 202-5 and network device 202-6; network segment 204-7 may connect network device 202-6 and network device 202-7; network segment 204-8 may connect network device 202-7 and network device 202-8; network segment 204-9 may connect network device 202-8 and network device 202-5; and network segment 204-10 may connect network device 202-8 and network device 202-6.

In addition, network region 106 may include network devices 202-9 through 202-12 and network segments 204-11 through 204-15. Network segment 204-11 may connect network device 202-9 and network device 202-10; network segment 204-12 may connect network device 202-10 and network device 202-11; network segment 204-13 may connect network device 202-11 and network device 202-12; network segment 204-14 may connect network device 202-12 and network device 202-9; and network segment 204-15 may connect network device 202-12 and network device 202-10.

Network region 102 may connect to network region 104 by virtue of link 108 between network device 202-3 in region 102 and network device 202-5 in region 104. Network region 102 may connect to network region 106 by virtue of link 110 between network device 202-2 in region 102 and network device 202-12 in region 106. Network region 104 may connect to network region 106 by virtue of link 112 between network device 202-6 in region 104 and network device 202-11 in region 106.

The topology of network 100 and regions 102, 104, and 106 may introduce situations, such as endless communication loops and broadcast floods, which may be undesirable. To help avoid these and other situations, some network topologies may employ spanning trees. A spanning tree may have block, disable, and/or deactivate ports in network devices, such as network devices 202, to help avoid endless communication loops or broadcast floods in a network, such as network 100 and/or regions 102, 104, or 106. In other words, a spanning tree may provide a single path for a data unit between any source and any destination in a network or a region of a network to help avoid, for example, broadcast floods or endless loops. A given topology may have many possible different spanning trees and each spanning tree may be known as a spanning tree instance or, more simply, an instance.

FIG. 3 is a block diagram of exemplary spanning tree instances I1 through I4 of a network topology, such as the network topology shown in regions 102, 104, and 106 in FIG. 2. For exemplary purposes, FIG. 3 shows network devices 202 and network segments 204 in region 102, e.g., network devices 202-1 through 202-4 and network segments 204-1 through 204-5.

As shown in FIG. 3, instance I1 may block a port in network device 202-3 that provides connectivity to segment 204-2. In FIG. 3, blocked ports are marked with an "X." Instance I1 may also block a port in network device 202-2 that provides connectivity to segment 204-1. Therefore, a data unit traversing region 102 from any segment 204-x or network devices 202-x in accordance with instance I1 may only have one path to any other segment 204-x or network device 202-x.

Instance I2 may block a port in network device 202-4 that provides connectivity to segment 204-5. Instance I2 may also block a port in network device 202-1 that provides connectivity to segment 204-4. Therefore, a data unit traversing region 102 from any segment 204-x or network devices 202-x in accordance with instance I2 may only have one path to any other segment 204-x or network device 202-x.

Instance I3 may block a port in network device 202-3 that provides connectivity to segment 204-2. Instance I3 may also block a port in network device 202-2 that provides connectivity to segment 204-5. Therefore, a data unit traversing region 102 from any segments 204-x or network device 202-x in accordance with instance I3 may only have one path to any other segment 204-x or network device 202-x.

Instance I4 may block a port in network device 202-2 that provides connectivity to segment 204-5. Instance I4 may also block a port in network device 202-2 that provides connectivity to segment 204-1. Therefore, a data unit traversing region 102 from any of segments 204 or network devices 202 in accordance with instance I4 may only have one path to any other segment 204-x or network device 202-x.

Instances I1 through I4 are exemplary. Other, different spanning tree instances are possible. For example, common spanning trees (CSTs) may be formed among regions to help avoid endless loops and broadcast floods between network regions, e.g., regions 102, 104, and 106. In one embodiment, devices 202 may determine spanning tree instances according to a spanning tree protocol, such as defined in the IEEE Standards 802.1D, 802.1W (Rapid Spanning Tree Protocol (RSTP)), or 802.1Q (Multiple Instances Spanning Tree Protocol (MISTP)).

A region, such as regions 102, 104, or 106, may use one or more instances at any given time. In one embodiment, a region may employ different instances for forwarding traffic from different VLANs. For example, data units belonging to a first VLAN may be forwarded according to instance I1; data units belonging to a second VLAN may be forwarded according to instance I2; data units belonging to a third VLAN may be forwarded according to instance I3; and data units belonging to a fourth VLAN may be forwarded according to instance I4. Such a protocol may, for example, balance the load among network segments 204. Such a mapping of VLANs to spanning tree instances may be stored in a table that may be stored in one or more of network devices 202.

Exemplary Network Device

Figure 4:
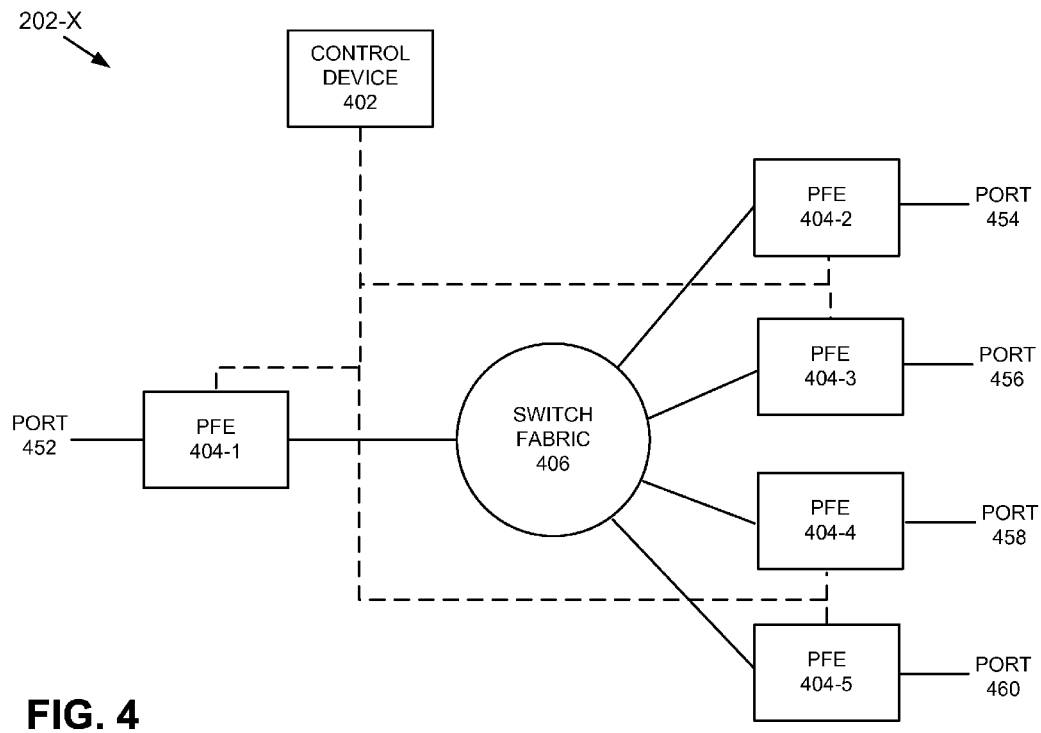
FIG. 4 shows a block diagram of an exemplary network device of the network depicted in FIG. 1.

FIG. 4 shows an exemplary block diagram of exemplary components of network device 202-x. As illustrated, network device 202-x may include a control device 402, packet forwarding engines 404-1 through 404-5 (collectively "PFEs 404," individually "PFE 404-x"), and a switch fabric 406. Network device 202-x may include other or different components (not shown) that aid in receiving, transmitting, and/or processing data. For example, there may be more than or less than five PFEs. Moreover, other configurations of components in network device 202-x are possible. Although components of network device 202-x are shown together, one or more components of network device may be remotely located from each other.

Control device 402 may perform high level management functions for network device 202-x. For example, control device 402 may communicate with other networks and/or systems connected to network device 202-x to exchange information regarding network topology. In one embodiment, control device 402 may communicate with other networks and/or systems to exchange information regarding network topology. Control device 402 may create spanning tree instances and/or routing tables based on network topology information, create forwarding tables based on the routing tables, and forward the forwarding tables to PFEs 404. PFEs 404 may use the forwarding tables to perform route lookups for incoming packets. Control device 402 may also perform other general control and monitoring functions for network device 202-x.

PFEs 404 may each connect to control device 402 and switch fabric 406. Connections between PFEs 404 and control device 402 are indicated by dashed lines. PFEs 404 may receive packet data on physical ports 452-460 connected to a network segment, such as one of network segments 204. Each physical port may include one of many types of transport media, such as an optical fiber or Ethernet cable. Data on the physical port may be formatted according to one of several protocols, such as the synchronous optical network (SONET) standard, an asynchronous transfer mode (ATM) technology, Ethernet, or Internet Protocol. The data may take the form of data units, where each data unit may include all or a portion of a packet.

A PFE 404-x may process incoming data units prior to transmitting the data units to another PFE 404-x or the network. To facilitate this processing, PFE 404-x may reassemble the data units into a packet and perform a route lookup for the packet using a forwarding table to determine destination information. If the destination information indicates that the packet should be sent out on a physical port connected to PFE 404-x, then PFE 404-x may prepare the packet for transmission by, for example, segmenting the packet into data units, adding any necessary headers, and transmitting the data units through the physical port. If the destination information indicates that the packet should be sent out on a physical port not connected to PFE 404-x, then PFE 404-x may transfer the packet or data units to another PFE 404-x through switch fabric 406.

Exemplary Packet Forwarding Engine

Figure 5:
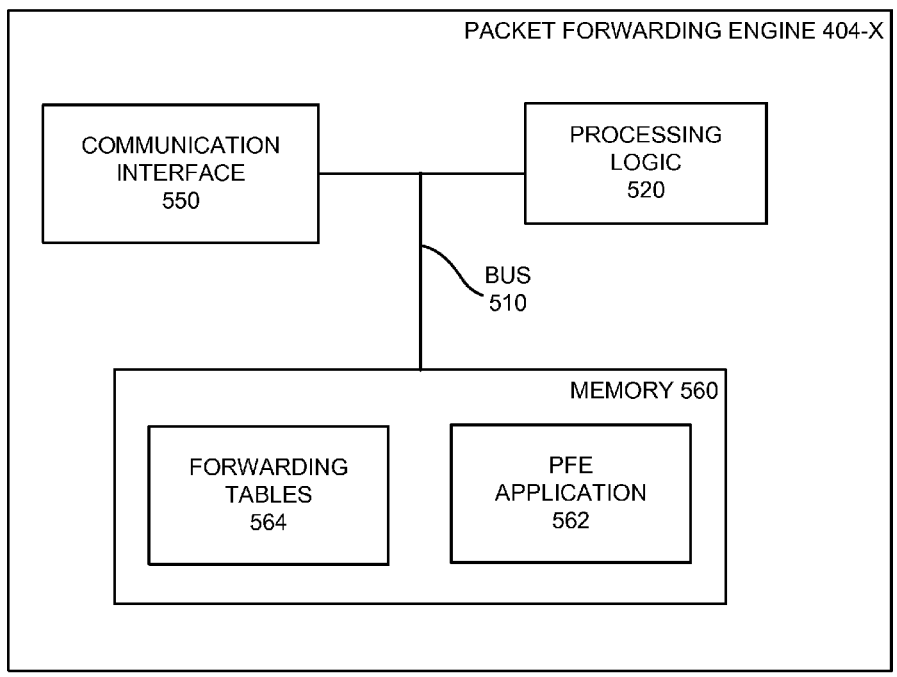
FIG. 5 is a block diagram of an exemplary packet forwarding engine of the network device depicted in FIG. 4.

FIG. 5 is a block diagram illustrating exemplary components of a PFE 404-x. As illustrated, PFE 404-x may include a bus 510, processing logic 520, a communication interface 550, and a memory 560. PFE 404-x may include other or different components (not shown) that aid in receiving, transmitting, and/or processing data. Moreover, other configurations of components in PFE 404-x are possible. Although components of PFE 404-x are shown together, one or more components of PFE 404-x may be remotely located from each other.

Bus 510 may permit communication among the components of PFE 404-x. Processing logic 520 may perform routing functions and handle packet transfers to and from a port and switch fabric 406. For each packet that PFE 404-x handles, processing logic 520 may perform a route-lookup function and may perform other processing-related functions. Processing logic 520 may include any type of processor or microprocessor that interprets and executes instructions. In other embodiments, processing logic 520 may include an application-specific integrated circuit (ASIC), a field programmable gate array (FPGA), or the like.

Communication interface 550 may include any transceiver-like mechanism that enables PFE 404-x to communicate with other devices, such as another one of network devices 202, systems, or components of network device 202-x. For example, communication interface 550 may include mechanisms for communicating with switch fabric 406 or another network device 202-x.

Memory 560 may include a random-access memory (RAM) or another type of dynamic storage device that stores information and instructions for execution by processing logic 520, a read-only memory (ROM) or another type of static storage device that stores static information and instructions for processing logic 520, and/or some other type of magnetic or optical recording medium and its corresponding drive for storing information and/or instructions.

Memory 560 may include a PFE application 562 and forwarding tables 564. PFE application 562 may include instructions for assisting PFE 404-x in forwarding packets. Forwarding tables 564 may store information that may allow PFE application 562 to determine which port or ports network device 202-x may use to forward a packet. PFE application 562 may include instructions for maintaining information stored in forwarding tables 564. PFE application 562 may also include instructions for accessing forwarding tables 564 when forwarding packets. Software instructions, such as PFE application 562, contained in a computer-readable medium may be executed by processing logic 520 to cause PFE 404-x and/or network device 202-x to perform these and other acts. The software instructions may be read into memory 560 from another computer-readable medium or from another device via communication interface 550.

Exemplary Control Device

Figure 6:
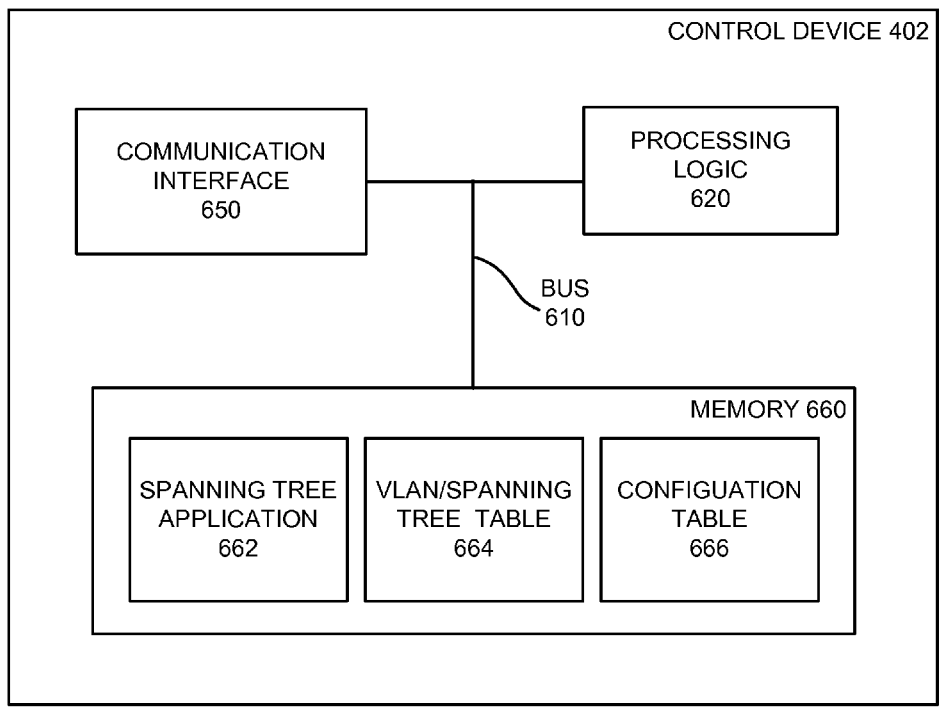
FIG. 6 is a functional block diagram of an exemplary control device of the network device depicted in FIG. 4.

FIG. 6 is a block diagram illustrating exemplary components of control device 402. Control device 402 may include a bus 610, processing logic 620, a communication interface 650, and a memory 660. Control device 402 may include other or different components (not shown) that aid in receiving, transmitting, and/or processing data. Moreover, other configurations of components in control device 402 are possible. Although components of control device 402 are shown together, one or more components of control device may be remotely located from each other.

Bus 610 may permit communication among the components of control device 402. Processing logic 620 may perform high level management functions for network device 202-x. For example, processing logic 620 may analyze network topologies received from networks and/or systems connected to network device 202-x to generate spanning tree instances. Processing logic 620 may create routing tables based on network topology information, create forwarding tables based on the routing tables, and forward the forwarding tables to PFEs 404.

Processing logic 620 may include any type of processor or microprocessor that interprets and executes instructions. In other embodiments, processing logic 620 may include an ASIC, FPGA, or the like.

Communication interface 650 may include any transceiver-like mechanism that enables control device 402 to communicate with other devices, systems, or components of network device 202-x. For example, communication interface 650 may include mechanisms for communicating with PFEs 404 or other network devices.

Memory 660 may include a RAM or another type of dynamic storage device that stores information and instructions for execution by processing logic 620, a ROM or another type of static storage device that stores static information and instructions for processing logic 620, and/or some other type of magnetic or optical recording medium and its corresponding drive for storing information and/or instructions.

Memory 660 may include a spanning tree application 662, a VLAN/spanning tree table 664 (e.g., an instance table 664 or a VLAN/instance table 664), and a configuration table 666. Spanning tree application 662 may include software instructions for assisting network device 202-x in creating spanning tree instances, such as such as defined in the IEEE Standards 802.1D, 802.1W, or 802.1Q. Software instructions, such as those included in spanning tree application 662, contained in a computer-readable medium may be executed by processing logic 620 to cause network device 202-x to perform these and other acts described herein. The software instructions may be read into memory 660 from another computer-readable medium or from another device via communication interface 650.

VLAN/instance table 664, described in detail below, may store information that maps VLANs to spanning tree instances. Configuration table 666, described in detail below, may store information regarding the region to which network device 202-x belongs.

Exemplary Tables

FIGS. 7A, 7B, and 7C are block diagrams of exemplary VLAN/instance table 664 at, for example, different time periods, e.g., VLAN/instance table 664-1, table 664-2, and table 664-3 (collectively "instance table 664"). Instance table 664 may store information regarding the mapping of VLANs to spanning tree instances employed by a network device, such as network device 202-x. Instance table 664 may be stored, for example, in memory 660 of system control device 402. In addition, instance table 664 or portions thereof may be stored in other devices coupled to network 100. In one embodiment, each of network devices 202 may store a corresponding VLAN/instance table.

Each entry, e.g., row, in instance table 664 may associate a VLAN to a spanning tree instance. As illustrated, instance table 664 may include a VLAN field 702 and an instance field 704. Instance table 664 may include additional, different, or fewer fields than illustrated in FIGS. 7A, 7B, and 7C.

VLAN field 702 may identify a VLAN. Exemplary instance table 664-1 lists four VLANs in VLAN field 702: VLAN A, VLAN B, VLAN C, and VLAN D. Exemplary instance table 664-2 lists five VLANs in VLAN field 702, e.g., those in instance table 664-1 and VLAN E. Exemplary instance table 664-3 lists six VLANs in VLAN field 702, e.g., those in instance table 664-2 and VLAN F.

Instance field 704 may identify the spanning tree instance that a device may use when forwarding a packet on the corresponding VLAN. For example, according to instance table 664-1, table 664-2, and table 664-3, data units being forwarded on VLAN A (record 720) or VLAN C (record 724) may be forwarded according to instance I1; packets being forwarded on VLAN B (record 722) or VLAN D (record 726) may be forwarded according to instance I2. According to instance table 664-2 and table 664-3, packets being forwarded on VLAN E (record 728) may be forwarded according to instance I3. According to instance table 664-3, packets being forwarded on VLAN F may be forwarded according to instance I4.

When a device, such as network device 202-x receives a packet, it may determine the VLAN to which the packet belongs (e.g., VLAN A, B, C, D, E, or F). The device may then consult instance table 664 to determine the spanning tree instance to follow for forwarding the packet to its destination. In one embodiment, each network device 202-x in a region, such as region 102, may include the same information each respective instance table.

To identify different instance tables or an instance table at different states, such as instance tables 664-1, 664-2, and 664-3, a digest of the table may be calculated and the instance tables may be identified by their respective digests. A digest may include, for example, the Message-Digest Algorithm Number 5 (MD5). In practice, two different instance tables or an instance table at two different states (such as instance tables 664-1 and 664-2) may have two different digests. For example, instance table 664-1 may have a digest of IAX5, as shown below table 664-1; instance table 664-2 may have a digest of 52BY, as shown below table 664-2; and instance table 664-3 may have a digest of 62DX, as shown below table 664-3. Although these digests are shown in FIGS. 7A, 7B, and 7C, the digests may or may not be stored in tables 664-1, 664-2, or 664-3. In one embodiment, a digest may include a unique identifier of the VLAN/instance table other than a digest, for example.

FIGS. 8A, 8B, and 8C are block diagrams of exemplary configuration table 666 at, for example, different time periods, e.g., configuration table 666-1, table 666-2, and table 666-3 (collectively "configuration table 666"). Configuration table 666 may store configuration information regarding the region to which a network device, such as network device 202-x, may belong. Configuration table 666 may be stored, for example, in memory of system control device 402. In one embodiment, each of network devices 202 may store a corresponding configuration table.

As illustrated, configuration table 666 may include a region name field 802, a revision field 804, a primary digest field 806, an alternate digest field 808, and a freeze flag field 810. Configuration table 666 may include additional, different, or fewer fields than illustrated in FIGS. 8A, 8B, and 8C. For example, in one embodiment, primary digest field 806 and alternate digest field 808 may be combined into a single field. In another example, freeze flag field 810 and/or alternate digest field 808 may not be present.

Region name field 802 may include the name of the region to which a network device, such as network device 202-x, belongs. In one embodiment, a network administrator may define the region name for field 802. Revision field 804 may include a two-byte field regarding a protocol revision for the spanning tree protocol, for example, used to generate spanning tree instances. In one embodiment, a network administrator may define the revision for field 804.

Primary digest field 806 may include the digest, such as an MD5, of the VLAN/instance table associated with the region. Alternate digest field 808 may include one or more additional digests of VLAN/instance tables associated with the region. Together primary digest field 806 and alternate digest field 808 may provide a list of digests associated with the region corresponding to configuration table 666. The primary and alternate digests for fields 806 and 808 may be determined automatically by network device 202-x. In one embodiment, primary digest field 806 and alternate digest field 808 may store unique identifiers of VLAN/instance tables other than digests, for example.

Freeze flag field 810 may include information indicative of whether a network device, such as network device 202-x may use a primary and/or alternate digest, such as the digests stored in primary digest field 806 and/or alternate digest field 808. For example, a freeze flag field 810 of NO may indicate that the network device 202-x may use primary digest field 806 and/or alternate digest field 808 to determine whether a received data unit or BPDU is in the same region. A freeze flag field 820 of YES may indicate that the network device may use alternative methods to determine whether a received data unit is in the same region. Alternative methods, as described below, may include using information stored in region field 802 or determining the port on which the data unit was received.

Exemplary configuration table 666 indicates that the region name is REGION 102 (as indicated in region name field 802); that the protocol revision is CD (as indicated in the revision field 804). Exemplary configuration table 666 also indicates a primary digest of IAX5 (as indicated in primary digest field 806). A primary digest of IAX5 corresponds to instance table 664-1, which may be the instance table used by network devices 202 in region 102 in this example.

In the example of configuration table 666-1, there are no alternate digests (as indicated in the alternate digest field 808). Configuration table 666-2 may store the digest of 52BY in alternate digest field 808, which corresponds to instance table 664-2. In the example of configuration table 666-2, instance table 664-2 may be an alternate or additional instance table used by one or more of network devices 202 in region 102. Exemplary configuration table 666-3 may store the digest of 62DX in alternate digest field 808, which corresponds to instance table 664-3. In the example of configuration table 666-3, instance table 664-3 may be an instance table used by one or more of network devices 202 in region 102.

In the example of configuration table 666-1, freeze flag field 810 may store a value of NO, indicating that network device 202-x may use primary digest field 806 and/or alternative digest field 808 in determining the region to which network device 202-x may belong. In the example of configuration table 666-2 and 666-3, freeze flag field 810 may store a value of YES, indicating that network device 202-x may, in one embodiment, ignore primary digest field 806 information and/or alternate digest field 808 information in determining the region to which network device 202-x may belong.

As mentioned above, network devices 202 may use a number of protocols to determine spanning tree instances. To implement these protocols, a network device 202-x may send and/or receive information regarding the topology of its region. Network devices 202 may use Bridge Protocol Data Units (BPDUs) to exchange network information, such as topology, cost, and other information. BPDUs may be broadcast, e.g. propagated or exchanged, throughout a network, such as network 100, or a region, such as region 102. BPDUs may be exchanged when there is a change in the network or on a periodic basis, e.g., every two seconds. Although BPDUs are used in the example descriptions below, a data unit other than a BPDU may be used.

A BPDU may indicate the region to which it applies by including the following information: a region name, a protocol revision identifier, and/or a digest of the VLAN/instance table. For example, network device 202-3 may send a BPDU to its neighbors, e.g., network devices 202-4, 202-2, and 202-5. The BPDU sent by network device 202-3 may include the following information from its configuration table (e.g., configuration table 666) indicating that the BPDU includes information about region 102: the region name (e.g., REGION 102), the protocol revision identifier (e.g., CD), and the digest of the VLAN/instance table (e.g., IAX5). When network device 202-5 receives the BPDU on a port from network device 202-3, network device 202-5 may determine that the BPDU belongs to a different region and that the port on which network device 202-5 received the BPDU is on the boundary of a region, e.g., the boundary between region 102 and region 104. Network device 202-5 may make this determination by comparing the region information in the BPDU to information in its configuration table. Because the BPDU received by network device 202-5 from network device 202-3 is in a different region, network device 202-5 may choose to discard or ignore the BPDU.

On the other hand, network devices 202-4 and 202-2 may each determine that the BPDU received from network device 202-3 is from a network device in the same region, e.g., region 102. Network devices 202-2 and 202-4 in region 102 may analyze the BPDU further because these network devices 202-2 and 202-4 are in the same region as the network device that sent the BPDU, e.g., network device 202-3.

If a network administrator changes the VLAN/instance table in a network device, even temporarily, the digest of the VLAN/instance table may change, resulting in the formation of a new region. The formation of a new region may prompt a reconfiguration of network 100 and be an inconvenience to the network administrator. In one embodiment, a network administrator may be able to change the VLAN/instance table, such as instance table 664, without causing the formation of a new region.

Exemplary Processing

Figure 9:
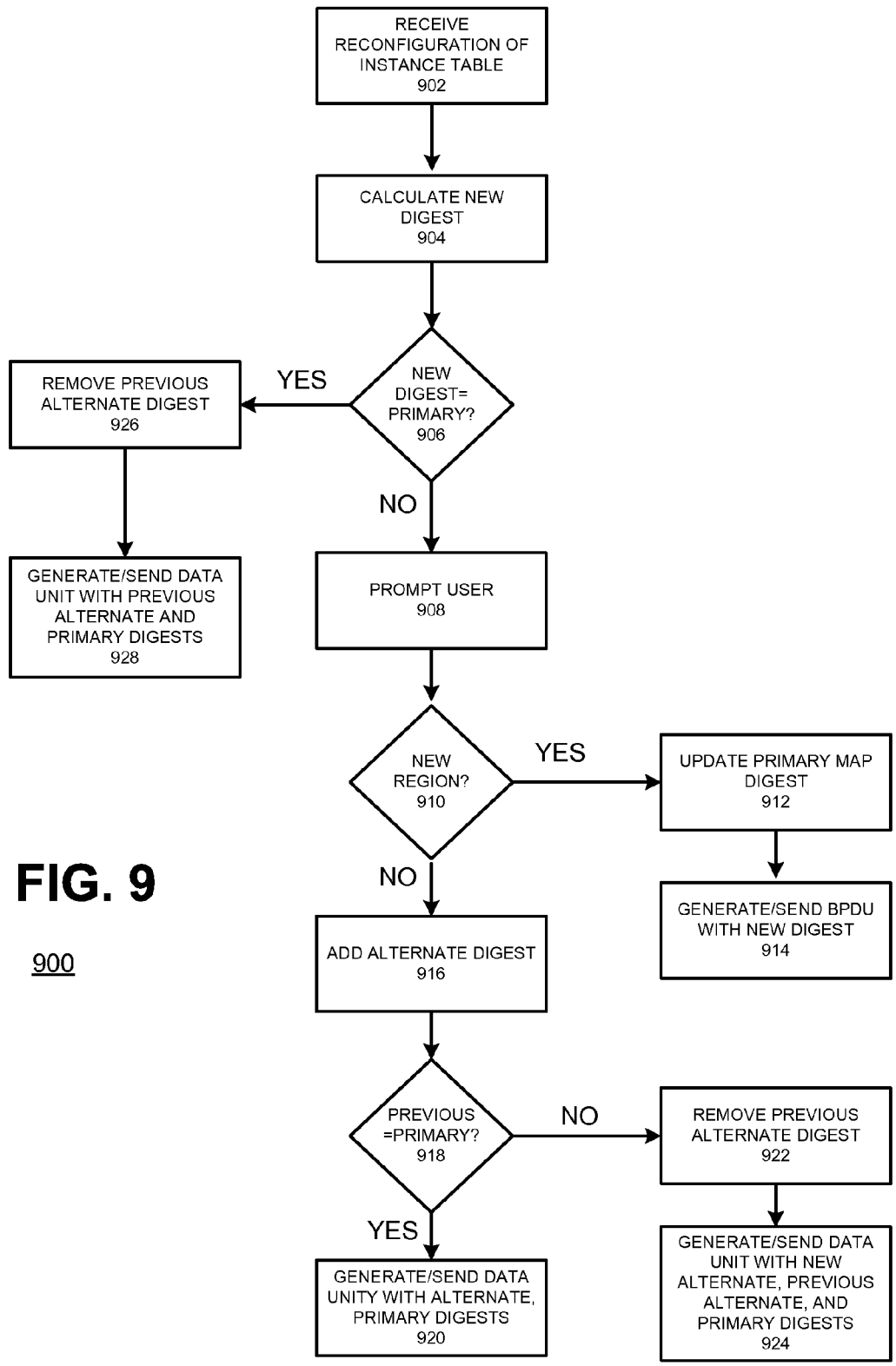
FIG. 9 is a flowchart of an exemplary process for reconfiguring a VLAN/instance table.

FIG. 9 is a flowchart of an exemplary process 900 for reconfiguring a VLAN/instance table. Process 900 is described with respect to exemplary instance table 664 and exemplary configuration table 666. In this example, region 102 may implement VLAN/instance table 664-1 and, as a result, network devices 202 in region 102 (e.g., network devices 202-1 through 202-4) may each include an instance table identical to instance table 664-1 shown in FIG. 7A and a configuration table identical to configuration table 666-1 shown in FIG. 8A. A network administrator, however, may wish to reconfigure network device 202-3 in region 102. In this example, the network administrator may wish to reconfigure network device 202-3 without creating a new region, for example.

Process 900 may begin when a reconfiguration of an instance table is received (block 902). For example, a network administrator may wish to map VLAN E to instance I3 as shown in record 728 of FIG. 7B. Network device 202-3 may receive the new record (e.g., record 728 as input from a network administrator) to add to its instance table. As a result, the instance table in network device 202-3 may become identical to instance table 664-2 of FIG. 7B.

A new digest may be calculated (block 904). Network device 202-3 may calculate the digest of its instance table (e.g., instance table 664-2) to be 52BY, e.g., the same digest indicated in FIG. 7B. The new digest may be compared to the primary digest (block 906). For example, network device 202-3 may compare the newly calculated digest (52BY) to the primary digest (IAX5) stored in its configuration table, e.g., configuration table 666-1. If the new digest is not the same as the primary digest (block 906: NO), the user may be prompted (block 908). In this example, the two digests (52BY and IAX5) are different and the administrator may be prompted regarding whether to create a new network region as a result of the new digest. In one embodiment, the network device, e.g., network device 202-3, may assume that a new region is not to be created unless directed otherwise.

If a new network region is to be created (block 910: YES), the network device may update its primary digest (block 912). In the current example, network device 202-3 may update its primary digest to be 52BY, rather than IAX5. The new digest may be transmitted to other network devices in subsequent BPDUs (block 914). In the current example, network device 202-3 may send BPDUs to network device 202-2, network device 202-3, and/or network device 202-5 to provide to those devices the new configuration of network device 202-3.

If the network administrator does not desire a new network region (block 910: NO), an alternate digest may be added to a configuration table (block 916). In the current example, network device 202-3 may add an alternate digest of 52BY to its configuration table, e.g., network device 202-3 may store configuration table 666-2 as shown in FIG. 8B having record 820' with 52BY indicated in alternate digest field 808.

If the digest of the previously stored instance table is the same as the primary digest stored in the configuration table (block 918: YES), then a data unit may be sent to other network devices (block 920). In the current example, the digest of the previously stored instance table (IAX5) is the same as the primary digest stored in configuration table 666-2 of network device 202-3. Network device 202-3 may send a data unit to instruct other network devices 202 (e.g., network devices 202-1, 202-2, and 202-4) in region 102 to associate the alternate digest 52BY with region 102. The data unit may include the new, alternate digest (e.g., 52BY), the primary digest (e.g., IAX5), and an instruction to associate the new, alternate digest (e.g., 52BY) with the region associated with the primary digest (e.g., region 102). In this example, the data unit may also include other information, such as the region name (e.g., REGION 102) and revision (e.g., CD). In one embodiment, the data unit to instruct the other network devices 202 may include a BPDU.

If the digest of the previously stored instance table is not the same as the primary digest stored in the configuration table (block 918: NO), then a data unit may be sent to other network devices (block 924) to instruct the disassociation of the previous alternate digest from the region. For example, at some point after mapping VLAN E to instance I3 (e.g., adding record 728 to instance table 664-2), the network administrator may wish to map VLAN F to instance I4 (e.g., add record 730 as shown in instance table 664-3) to the instance table in network device 202-3, also without creating a new region. In this example, process 900 may proceed as described above with respect to blocks 902, 904, 906 (NO), and 916. In this example, the configuration table stored in network device 202-3 may be as shown in configuration table 666-3, e.g. with an alternate digest of 62DX. In addition, the previous digest, e.g., that of instance table 664-2 (52BY), is not the same as the primary digest (IAX5). In this case, process 900 may move to block 922 and the previous alternate digest (52BY) may be removed from the configuration table, e.g., configuration table 666-3 does not include the previous alternate digest 52BY because, for example, it may no longer be needed. A data unit with the primary digest, the new alternate digest, and the previous digest may be sent (block 924). This data unit may instruct other network devices 202 to add the new alternate digest (62DX) to their configuration tables and remove the previous alternate digest (52BY). In one embodiment, the data unit to instruct the other network devices 202 may include a BPDU.

At some point after mapping VLAN E to instance I3 and VLAN F to instance I4, the network administrator may wish to return the instance table in network device 202-3 to its initial state, e.g., that of instance table 664-1. In this example, process 900 may proceed as described above with respect to blocks 902 and 904. However, the new digest (IAX5) may now be equal to the primary digest (IAX5) (block 906: YES). In this case, the previous alternate digest (62DX) may be removed from the configuration table of network device 202-3, e.g., from configuration table 666-3, returning to the state of configuration table 666-1 (block 926). A data unit with the previous alternate digest and the primary digest may be generated and sent (block 928). The data unit may instruct other network devices 202 in region 102 to remove the previous alternate digest from their respective configuration tables. In one embodiment, the data unit to instruct the other network devices 202 may include a BPDU.

Figure 10:
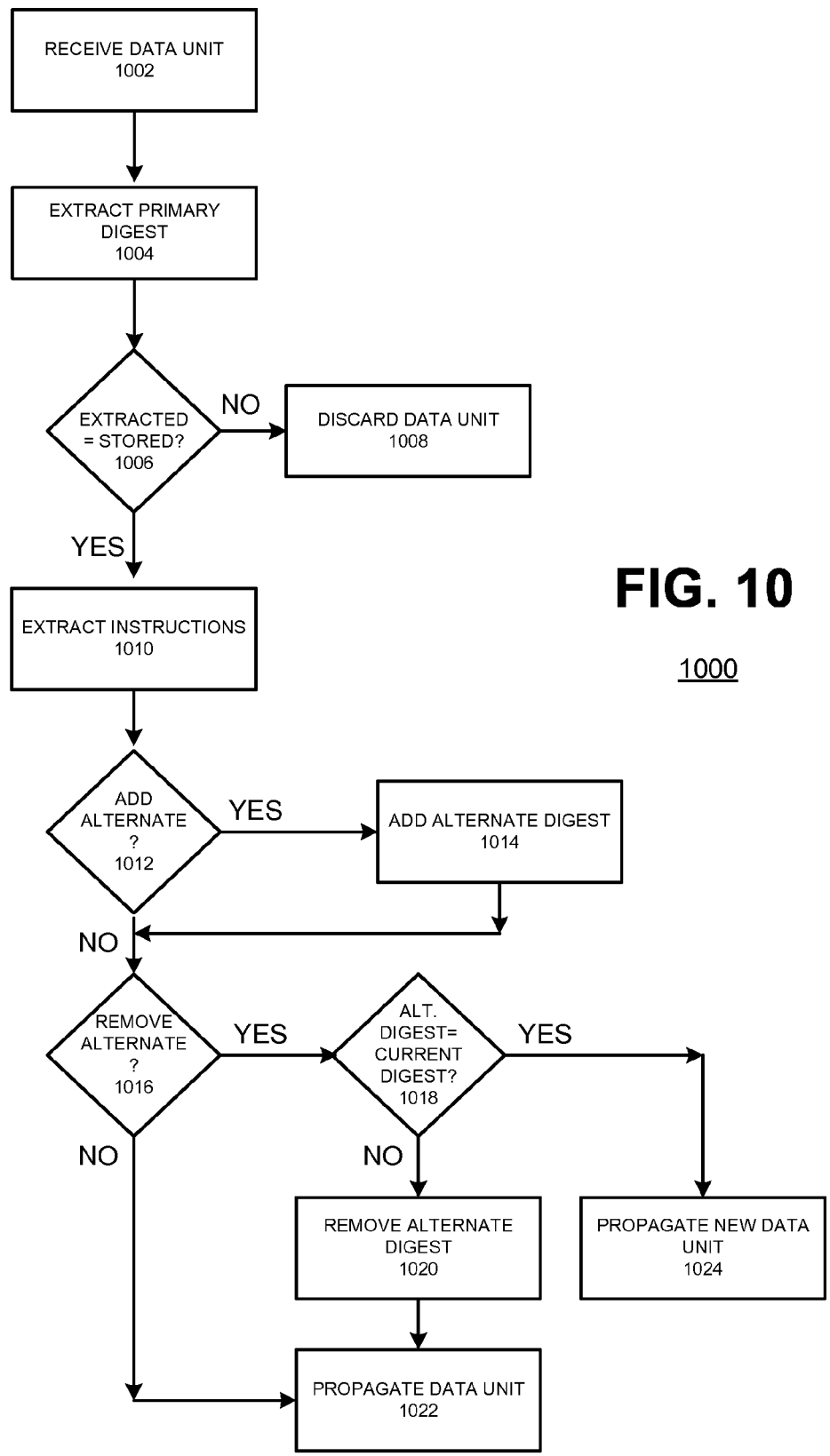
FIG. 10 is a flowchart of an exemplary process for receiving a data unit for updating a configuration table.

FIG. 10 is a flowchart of an exemplary process 1000 for receiving a data unit to update a configuration table in a network device. A data unit may be received (block 1002). For example, the data unit may include the data units sent during process 900 at block 920, 924, or 928. The data unit may be received, for example, by network device 202-4, network device 202-2, or network device 202-5 after having been sent from network device 202-3. In one embodiment, the data unit may include, for example, instructions to add or remove an alternate digest from a configuration table. In one embodiment, the data unit may include a BPDU.

The primary digest stored in the data unit may be extracted (block 1004). If the extracted primary digest is not the same as the primary digest stored in the configuration table of the network device that received the data unit (block 1006: NO), then the network device may discard the data unit (block 1008). In this case (block 1006: NO), the network device that received the data unit may not be in the same network region as the device that sent the data unit. For example, network device 202-5 may receive a data unit from network device 202-3 with instructions to add the digest 52BY as an alternate digest, as described above with respect to block 920. Network device 202-5 may ignore this instruction, in this example, because network device 202-5 includes a different primary digest in its memory because it is in a different region, e.g., region 104 and not region 102.

If the extracted primary digest is the same as the primary digest stored in the configuration table of the network device (block 1006: YES), then the network device that received the data unit may further inspect the data unit. In this case (block 1006: YES), the network device that received the data unit may be in the same network region (e.g., region 102) as the network device that sent the data unit. For example, network devices 202-4 and 202-2 may have the same primary digest stored in their configuration tables as found in the BPDU received from network device 202-3. As a result, process 1000 may proceed to block 1010.

Instructions may be extracted from the data unit (block 1010). If the extracted instruction is to add an alternate digest (block 1012), then the network device may add the alternate digest to its configuration table (block 1014). For example, the data units described above with respect to blocks 920 and 924 may include instructions to add an alternate digest to a configuration table. In this case, network device devices 202-4 and 202-2 may add an alternate digest to their respective configuration tables so as to appear, for example, as configuration table 666-2 and/or 666-3.

If the extracted instruction is to remove an alternate digest (block 1016: YES), then process 1000 may proceed to block 1018. If the alternate digest to be removed is different than the digest of the current instance table in the network device that received the data unit (block 1018), then the alternate digest may be removed from the configuration table (block 1020). For example, the data units described above with respect to blocks 928 and 924 may include instructions to remove an alternate digest from a configuration table. In this case, a network device may remove an alternate digest so that its configuration table may transition, for example, from one similar to configuration table 666-3 to configuration table 666-2 or 666-1. The data unit received may be propagated (block 1022) to other network devices to ensure that every network device in the region receives the instructions.

It may be the case that the instruction in the received data unit includes an instruction to remove an alternate digest that should not be removed, e.g., it is an alternate digest needed by the network device that received the data unit, e.g., a network device other than the network device that sent the data unit. In this situation, the network device that received the data unit may counter the removal instruction with an instruction to add the alternate digest back into configuration tables. If the alternate digest to be removed is the same as the digest of the instance table in the network device (block 1018: YES), then the network device may propagate a new data unit to add the alternate digest back into the configuration tables of network devices belonging to the region (block 1024). The new data unit may request that network devices 202 in region 102 add the alternate digest back into configuration tables. In one embodiment, there may be a delay block (not shown) between block 1018 and block 1024 to delay a period of time before propagating the new data unit (block 1024).

Figure 11:
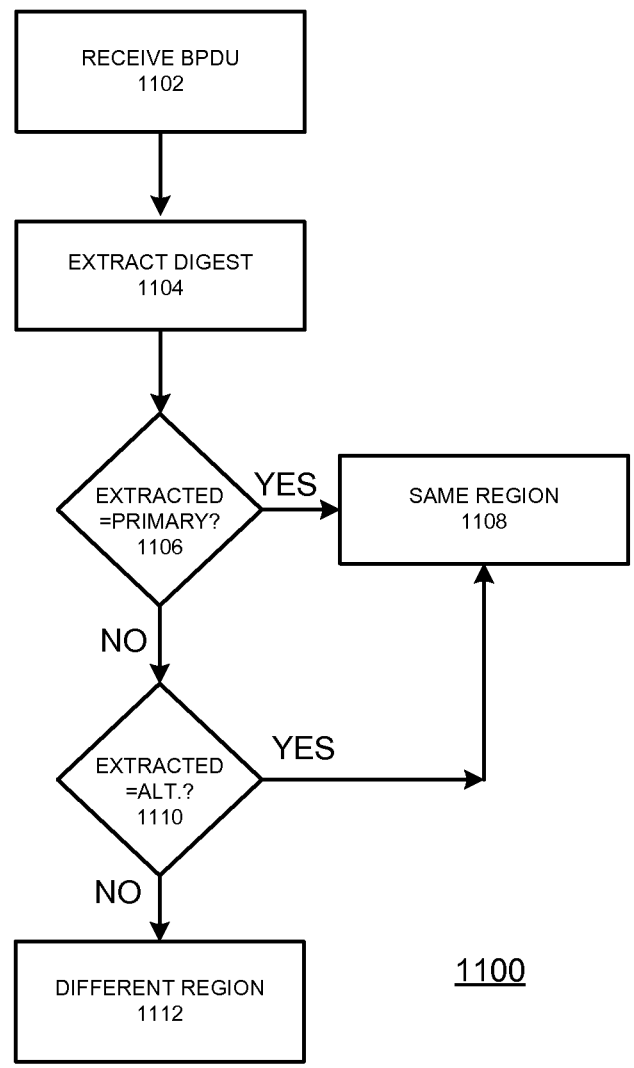
FIG. 11 is a flowchart of an exemplary process for receiving and processing a data unit regarding spanning trees in a network.

FIG. 11 is a flowchart of an exemplary process 1100 for receiving and processing a data unit regarding the spanning trees. A BPDU may be received (block 1102). The digest may be extracted (block 1104). If the extracted digest is the same as the primary digest stored in the configuration table (block 1106: YES), then the network device may be in the same region as the network device that sent the BPDU and the BPDU may be used for network configuration (block 1108). If the extracted digest is different than the primary digest stored in the configuration table (block 1106: NO), but the extracted digest is the same as one of the alternate digests stored in the configuration table (block 1110: YES), then the network device may be in the same region as the network device that sent the BPDU and the BPDU may be used for network configuration (block 1108). If the extracted digest is different than the primary digest stored in the configuration table (block 1106: NO) and the extracted digest is not the same as one of the alternate digests stored in the configuration table (block 1110: NO), then the network device may not be in the same region as the network device that sent the BPDU (block 1112) and the BPDU may not be used for network configuration.

Figure 12:
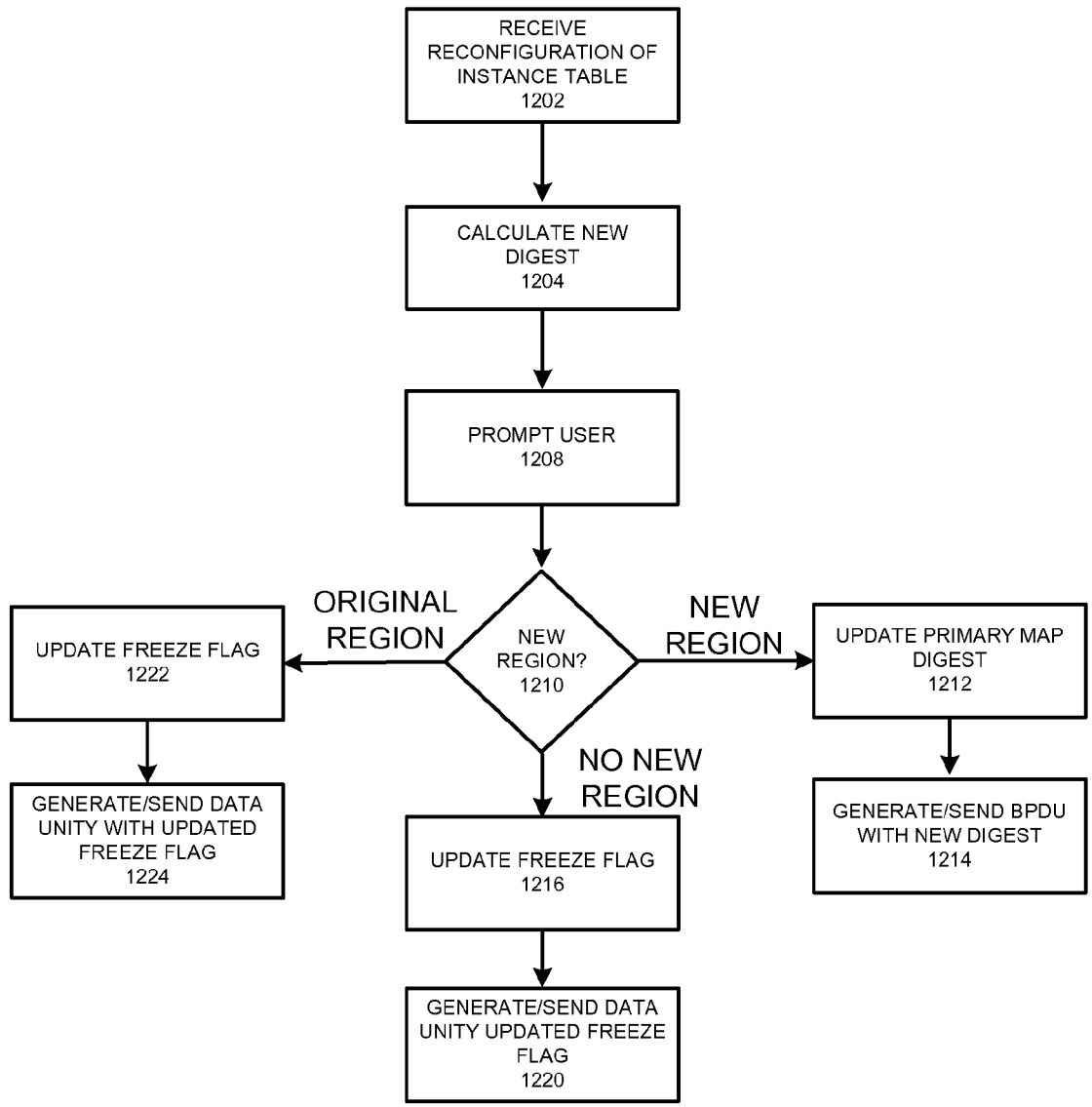
FIG. 12 is a flowchart of an exemplary process for reconfiguring a VLAN/instance table.

FIG. 12 is a flowchart of an exemplary process 1200 for reconfiguring a VLAN/instance table. Process 1200 is described with respect to exemplary instance table 664 and exemplary configuration table 666. In this example, region 102 may implement VLAN/instance table 664-1 and, as a result, network devices 202 in region 102 (e.g., network devices 202-1 through 202-4) may each include an instance table identical to instance table 664-1 shown in FIG. 7A and a configuration table identical to configuration table 666-1 shown in FIG. 8A. A network administrator, however, may wish to reconfigure network device 202-3 in region 102. In this example, the network administrator may wish to reconfigure network device 202-3 without creating a new region, for example.

Process 1200 may begin when a reconfiguration of an instance table is received (block 1202). For example, a network administrator may wish to map VLAN E to instance I3 as shown in record 728 of FIG. 7B. Network device 202-3 may receive the new record (e.g., record 728 as input from a network administrator) to add to its instance table. As a result, the instance table in network device 202-3 may become identical to instance table 664-2 of FIG. 7B.

A new digest may be calculated (block 1204). Network device 202-3 may calculate the digest of its instance table (e.g., instance table 664-2) to be 52BY, e.g., the same digest indicated in FIG. 7B. If the new digest is not the same as the primary digest, the user may be prompted (block 1208). In this example, the two digests (52BY and IAX5) are different and the administrator may be prompted regarding whether (1) to create a new network region as a result of the new digest, (2) not to create a new network region as a result of the new digest, and/or (3) to return to a previous original state for the region.

If a new network region is to be created (block 1210: NEW REGION), the network device may update its primary digest (block 1212). In the current example, network device 202-3 may update its primary digest to be 52BY, rather than IAX5. The new digest may be transmitted to other network devices in subsequent BPDUs (block 1214). In the current example, network device 202-3 may send BPDUs to network device 202-2, network device 202-3, and/or network device 202-5 to provide to those devices the new configuration of network device 202-3.

If the network administrator does not desire a new network region (block 1210: NO NEW REGION), the flag in freeze flag field 810 may be updated to YES (block 1216). Network device 202-3 may also change the digest in primary digest field 806 to 52BY (not shown in configuration table 666). Alternatively, network device 202-3 may add an alternate digest of 52BY to its configuration table, e.g., network device 202-3 may store configuration table 666-2 as shown in FIG. 8B having record 820' with 52BY indicated in alternate digest field 808 as described above with respect to process 900 of FIG. 9.

Network device 202-3 may send a data unit to instruct other network devices 202 (e.g., network devices 202-1, 202-2, and 202-4) in region 102 to update freeze flag field 810 (block 1220). In another embodiment, a network administrator may update freeze flag 810 manually. The data unit may include the previous digest (e.g., IAX5) or the new digest (e.g., 52BY), and an instruction to update the freeze flag field 810 to YES. In this example, the data unit may also include other information, such as the region name (e.g., REGION 102) and revision (e.g., CD). In one embodiment, the data unit to instruct the other network devices 202 may include a BPDU.

At some point after mapping VLAN E to instance I3, the network administrator may wish to return the instance table in network device 202-3 to its original, initial state, e.g., that of instance table 664-1. In this example, process 1200 may proceed as described above with respect to blocks 1202, 1204, and 1208. If the administrator whishes to return to the original region state (block 1210: ORIGINAL REGION), then the information in freeze flag field 810 may be updated (block 1222), e.g., changed to NO. Device 202-3 may also update the primary digest information stored in primary digest field 806 and/or may remove digest information stored in alternate digest field 808 as described above with respect to process 900 of FIG. 9. A data unit may be sent to other network devices (block 1224) to instruct the update of the information in freeze flag field 810, e.g., to change the information in flag field 810 to YES.

Figure 13:
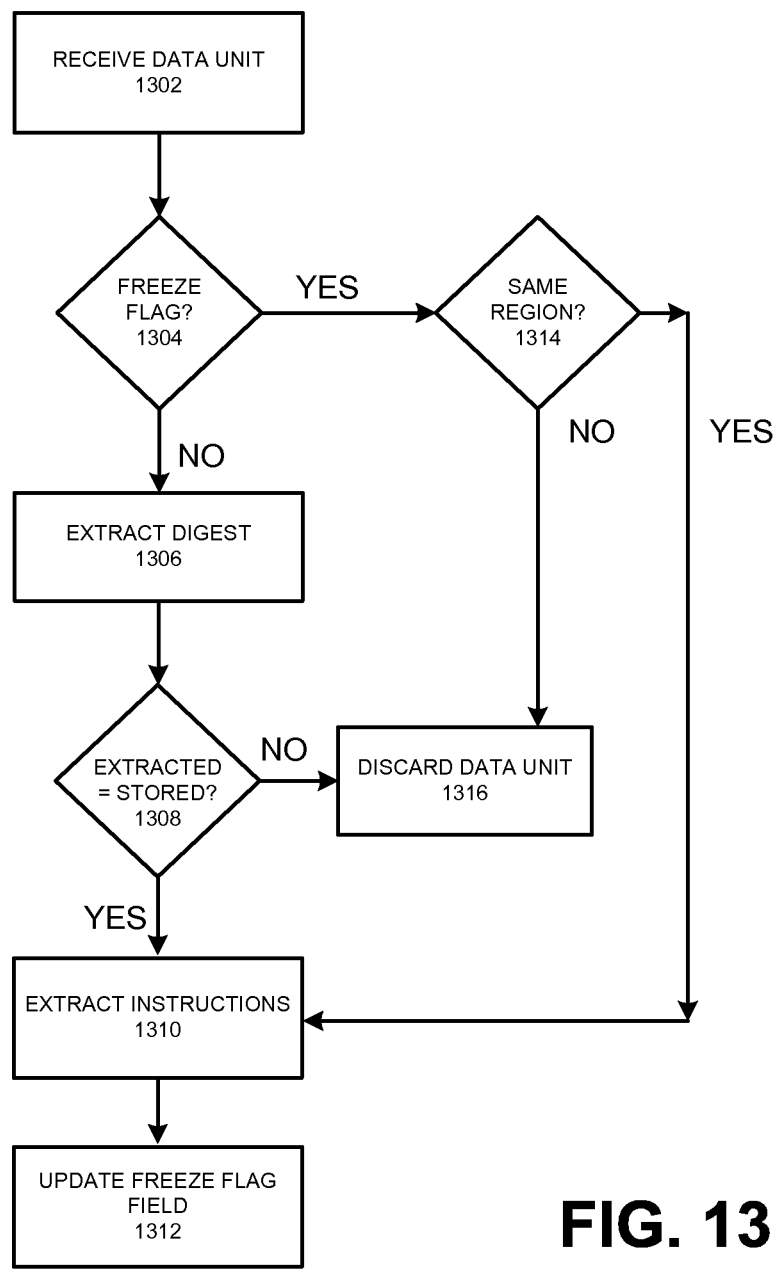
FIG. 13 is a flowchart of an exemplary process for receiving a data unit to update a configuration table in a network device.

FIG. 13 is a flowchart of an exemplary process 1300 for receiving a data unit to update a configuration table in a network device. A data unit may be received (block 1302). For example, the data unit may include the data units sent during process 1200 at block 1220 or block 1224. The data unit may be received, for example, by network device 202-4, network device 202-2, or network device 202-5 after having been sent from network device 202-3. In one embodiment, the data unit may include, for example, instructions to update information in freeze flag field 810 in a configuration table. In one embodiment, the data unit may include a BPDU.

If the freeze flag stored in the receiving network device 202-x is NO (block 1304: NO), then the network device 202-x may use the digest stored in the data unit to determine the region to which the data unit belongs. The digest stored in the data unit may be extracted (block 1306). If the extracted digest is not the same as the digest stored in the configuration table of the network device 202-x that received the data unit (block 1308: NO), then network device 202-x may discard the data unit (block 1316). In this case (block 1316: NO), the network device that received the data unit may not be in the same network region as the device that sent the data unit.

If the extracted digest is the same as the primary digest stored in the configuration table of the network device 202-x that received the data unit (block 1308: YES), then the network device that received the data unit may further inspect the data unit. In this case (block 1308: YES), the network device that received the data unit may be in the same network region (e.g., region 102) as the network device that sent the data unit.

For example, network devices 202-4 and 202-2 may have the same digest stored in their configuration tables as found in the data unit received from network device 202-3. As a result, process 1300 may proceed to block 1310 described below.

If the freeze flag stored in the receiving network device 202-x is YES (block 1304: YES), then network device 202-x may use an alternative method to determine whether the received data unit applies to network device 202-x, e.g., whether network device 202-x is in the same region as the network device that sent the data unit. For example, network device 202-x may rely on other information in the data unit, such as the region name stored in its configuration table. The port on which the data unit was received may also be used to determine whether the received data unit is in the same region as the network device 202-x that received it. If it is determined that the data unit is from a different region (block 1314: NO), then the network device may discard the data unit (block 1316). In this case (block 1314: NO), the network device that received the data unit may not be in the same network region as the device that sent the data unit. If it is determined that the data unit is from the same region as the network device that received it (block 1314: YES), then process 1300 may proceed to block 1310.

Instructions may be extracted from the data unit (block 1310). If the extracted instruction is to update a freeze flag field, then the network device 202-x may update the freeze flag field to YES or NO as instructed (block 1314). For example, the data units described above with respect to blocks 1220 and 1224 may include instructions to update freeze flag field 810. In this case, network device devices 202-4 and 202-2 may change freeze flag field to their respective configuration tables so as to appear, for example, as configuration table 666-2 and/or 666-3. When in this state, a network device 202-x may determine whether a received BPDU or other data unit is from the same region as described below with respect to blocks 1304, 1314, and 1310.

CONCLUSION

Embodiments disclosed herein may allow for a network device to be reconfigured in a region of a network employing spanning trees. In one or more embodiments, the network device may be reconfigured without forming a new region in the network.

As used herein, the term "data unit" may include a packet, cell, or datagram; a fragment of a packet, cell, or datagram; a group of packets, cells, or datagrams; or other types of data.

It will be apparent that aspects, as described above, may be implemented in many different forms of software, firmware, and hardware in the embodiments illustrated in the figures. The actual software code or specialized control hardware used to implement these aspects is not limiting of the present invention. Thus, the operation and behavior of the aspects were described without reference to the specific software code—it being understood that software or control hardware could be designed to implement the aspects based on the description herein.

Further, although the processes described above, including processes 900, 1000, and 1100, may indicate a certain order of blocks, the blocks in these figures may be configured in any order.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
calculating, by a network device, a first digest based on a table associated with the network device;
determining, by the network device, whether the first digest is different from a second digest;
prompting, by the network device, a user to select whether to create a first region when the first digest is different from the second digest;
determining, by the network device, whether to create the first region for the first digest based on a selection of the user;
associating, by the network device, the first digest with a second region when the first region is not to be created, the second digest being associated with the second region before associating the first digest with the second region; and
providing, by the network device, a list of digests associated with the second region,
the list of digests including the first digest and the second digest.

2. The method of claim 1, further comprising:
receiving a new record for a Virtual Local Area Network (VLAN) that is different from a VLAN associated with the first digest; and
adding the new record to the table before calculating the first digest.

3. The method of claim 1, further comprising:
updating a primary field associated with the second region to equal the first digest when the first region is to be created;
generating a data unit based on the first digest; and
transmitting the data unit to a second network device.

4. The method of claim 1, further comprising:
updating a primary field associated with the second region based on receiving an indication to return to a previous original state for the second region; and
removing any digest information from an alternative field associated with the second region.

5. A method comprising:
determining, by a network device, whether to create a first region for a first digest;
associating, by the network device, the first digest with a second region when the first region is not to be created;
a second digest being associated with the second region before associating the first digest with the second region;
generating, by the network device, a data unit after associating the first digest with the second region,
the data unit including the first digest, the second digest, and instructions; and
transmitting, by the network device, the data unit to a second network device,
the second network device being connected to the network device.

6. The method of claim 5, where the instructions comprise one of:
instructions to associate the first digest with the second region, or
instructions to disassociate a previous alternative digest from the second region.

7. The method of claim 5, further comprising:
changing a freeze flag field, of the table, from a first value to a second value when the first region is not to be created.

8. A non-transitory computer-readable medium storing instructions, the instructions comprising:
one or more instructions that, when executed by a device, cause the device to:
determine whether to add a first digest to a table associated with a region;
associate the first digest with the region by adding the first digest to the table when the first digest is to be added to the table,
the table including a second digest associated with the region before adding the first digest to the table;
determine whether to remove a third digest from the table when the first digest is not to be added to the table;
remove the third digest from the table based on determining that the third digest is to be removed from the table;
provide the table,
the table including one or more of the first digest and the second digest.

9. The non-transitory computer-readable medium of claim 8, where the instructions further comprise:
one or more instructions that, when executed by a device, cause the device to:
determine whether the third digest is needed by a network device associated with
the table when the third digest is removed from the table; and
add the third digest back into the table when the third digest is needed by the network device.

10. The non-transitory computer-readable medium of claim 8, where the instructions further comprise:
one or more instructions that, when executed by the device, cause the device to:
receive a data unit from a network device;
extract a primary digest from the data unit;
determine whether the extracted primary digest is equal to a stored primary digest stored in the table; and
extract instructions, from the data unit, when the extracted primary digest is equal to the stored primary digest,
the extracted instructions indicating whether the first digest is to be added to the table.

11. The non-transitory computer-readable medium of claim 10, where the instructions further comprise:
one or more instructions that, when executed by the device, cause the device to:
determine whether the extracted primary digest is equal to a stored alternative digest stored in the table when the extracted primary digest is not equal to the stored primary digest; and
discard the data unit when the extracted primary digest is not equal to the stored primary digest or the stored alternative digest.

12. The non-transitory computer-readable medium of claim 10, where the instructions further comprise:
one or more instructions that, when executed by the device, cause the device to:
propagate the data unit to a second network device of the region.

13. A device comprising:
a storage device to store a table,
the table being associated with a first region,
the table including a primary field, an alternate field, and a freeze flag field, and
the primary field including a first digest; and
a processor to:
determine whether to create a second region,
change the freeze flag field from a first value to a second value when the second region is not to be created,
add a second digest to the alternate field when the second region is not to be created, and
transmit a data unit to a network device associated with the first region,
the data unit including instructions based on changing the freeze flag field.

14. The device of claim 13,
where the storage device is further to store a second table, and
where the second table comprises one or more records associated with different Virtual Local Area Networks (VLANs).

15. The device of claim 13, where the processor is further to:
receive a new record for a second table,
add the new record to the second table, and
calculate the second digest based on the second table.

16. The device of claim 15, where the processor is further to:
determine that the second table is to be returned to an original state before adding the new record, and
change the freeze flag field from the second value back to the first value based on determining that the second table is to be returned to the original state.

17. The device of claim 15, where, the processor is further to:
determine that the second table is to be returned to an original state before adding the new record, and
remove the second digest from the alternate field based on determining that the second table is to be returned to the original state.

18. The device of claim 13, where the processor is further to:
update the primary field by replacing the first digest with the second digest when the second region is to be created.

19. The device of claim 13, where, when determining whether to create the second region, the processor is to:
determine whether the second digest is equal to the first digest,
remove a third digest from the alternate field when the second digest is equal to the first digest,
prompt a user to select whether to create the second region when the second digest is different from the first digest, and
determine whether to create the second region based on a selection of the user.

20. The device of claim 13, where, when determining whether to create the second region, the processor is to:
calculate the second digest based on the table,
determine whether the second digest is different from the first digest, and
determine to create the second region when the second digest is different from the first digest.

* * * * *